US006984368B2

(12) United States Patent
Hajjatie et al.

(10) Patent No.: US 6,984,368 B2
(45) Date of Patent: Jan. 10, 2006

(54) PROCESS FOR PREPARING CALCIUM THIOSULFATE SOLUTION

(75) Inventors: Michael Massoud Hajjatie, Tucson, AZ (US); Harry Charles Kominski, III, Phoenix, AZ (US); Mark Daniel Aspengren, Chandler, AZ (US); Mark Pierce Clarkson, Phoenix, AZ (US); Constance Lynn Frank Lockhart, Tucson, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 58 days.

(21) Appl. No.: 10/456,568

(22) Filed: Jun. 9, 2003

(65) Prior Publication Data

US 2004/0247518 A1    Dec. 9, 2004

(51) Int. Cl.
*C01B 17/64*    (2006.01)
(52) U.S. Cl. ............... 423/514; 423/562; 423/566.3
(58) Field of Classification Search ............... 423/514, 423/562, 566.3
See application file for complete search history.

(56) References Cited

U.S. PATENT DOCUMENTS

| | | | | |
|---|---|---|---|---|
| 1,685,895 A | * | 10/1928 | Wood | 423/562 |
| 2,198,642 A | | 4/1940 | Vonkennel et al. | |
| 3,888,967 A | * | 6/1975 | Andersson et al. | 423/206.1 |
| 4,053,352 A | * | 10/1977 | Hultman et al. | 162/29 |
| 4,105,754 A | | 8/1978 | Swaine, Jr. et al. | |
| 4,505,776 A | * | 3/1985 | Murray | 162/51 |
| 4,853,136 A | * | 8/1989 | Roussel et al. | 210/761 |
| 4,976,937 A | * | 12/1990 | Lee et al. | 423/243.09 |
| 5,879,830 A | * | 3/1999 | Olper et al. | 429/49 |
| 6,159,440 A | | 12/2000 | Schoubye | |
| 2003/0072707 A1 | * | 4/2003 | Ray et al. | 423/514 |

FOREIGN PATENT DOCUMENTS

| | | |
|---|---|---|
| ES | 245171 | 11/1958 |
| JP | 48-6039 | 2/1973 |

OTHER PUBLICATIONS

H. Ballezo and O. Kaufmann, *Calciumthiosulfat*, 12 pages, Oct., 1948.
English Abstract for RU 2 167 101 C2 (Gipronikel Inst. Stock Co), May 20, 2001, "Method of Preparing Thiosulfates".

* cited by examiner

*Primary Examiner*—Wayne A. Langel
(74) *Attorney, Agent, or Firm*—Banner & Witcoff, Ltd.

(57) ABSTRACT

An efficient process to produce calcium thiosulfate ($CaS_2O_3$) from lime, sulfur and oxygen is described. By selecting appropriate process conditions such as mole ratios of lime to sulfur, temperature and pressure of the reaction process and the oxidation conditions, including rate and duration, the concentration of byproducts in the resulting suspension can be reduced to about 2% by weight or less. The solid particulate dispersion in the suspension tends to form a slimy solid suspension that is hard to filter if not treated properly. The suspension then can be acidified and treated with a flocculent. This agglomerates the solids into a floc that filters with ease. The resulting calcium thiosulfate is a clear liquid with concentrations achievable up to 29%.

17 Claims, 6 Drawing Sheets

PROCESS FOR PREPARING CALCIUM THIOSULFATE SOLUTION

FIELD OF THE INVENTION

The present invention is directed to plant nutrient solutions and, more particularly, to plant nutrient solutions containing calcium thiosulfate.

DESCRIPTION OF RELATED ART

The thiosulfate ion, $S_2O_3^{2-}$, is a structural analogue of the $SO_4^{2-}$ ion in which one oxygen atom is replaced by one S atom. However, the two sulfur atoms in $S_2O_3^{-2}$ are not equivalent. One of the S atoms is a sulfide-like sulfur atom that gives the thiosulfate its reducing properties and complexing abilities.

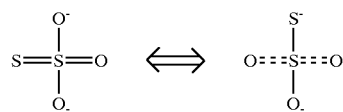

Thiosulfates are used in flue-gas de-sulfurization, cement additives, dechlorination, ozone and hydrogen peroxide quenching, coating stabilizers, and so on.

Due to complex-forming abilities with metals, thiosulfate compounds have also been used in commercial applications such as photography, waste treatment, and water treatment applications.

Thiosulfates readily oxidize to tetrathionates and sulfates:

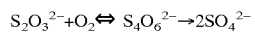

Due to this transformation, thiosulfates are used as fertilizers in combinations with cations such as ammonium, potassium, magnesium and calcium. The ammonium, alkali metal and alkaline earth thiosulfates are soluble in water. Water solubilities of thiosulfates decrease from ammonium to alkali metals to alkaline earth thiosulfates.

Calcium is an essential plant nutrient. Calcium availability is essential in the biochemistry of plants and, as it has been learned recently, in the nitrogen fertilizer efficiency of surface-applied urea. This should not be confused with the role of important soil amendments such as lime or gypsum with the need of soluble calcium by high-value crops. Both are extremely important in soil fertility and plant nutrition and complement each other.

Calcium has been applied as foliar in apple orchards as a preventive to a physiological problem known as "bitter pit' caused by calcium deficiency. Calcium is also important to potato, tomato, lettuce, carrot, alfalfa and other fruit and vegetable production. Tomato plants with calcium deficiency show severe infection with *Fusarium oxysporum*, the fungal pathogen that causes wilt and crown rot in tomatoes.

Although soluble calcium could be attained from calcium nitrate, calcium chloride and calcium ammonium nitrate (CAN), due to the $NO_3^-$, or $Cl^-$ anion presence, more environmentally friendly counter ion such $S_2O_3^{-2}$ is more desirable in the fertilizer application of calcium product.

It is contemplated that calcium thiosulfate can be produced using several alternative routes, such as:

I. Reaction of S and $SO_3^{2-}$ in neutral or alkaline medium;
II. Reaction of $S^{2-}$ and $SO_3^{-2}$ (via $SO_2$ and $HSO_3^{2-}$);
III. Oxidation of calcium hydrosulfide ($Ca(HS)_2$);
IV. Ion exchange reaction between alkaline thiosulfates and calcium chloride or nitrate;
V. Salt exchange between alkaline thiosulfates and lime, calcium chloride or nitrate; or
VI. Oxidation of calcium polysulfide.

However, most of these alternatives present serious difficulties. For example, routes I and II suffer from low calcium sulfite solubility as well as the need for $SO_2$. Route III suffers from the drawback that calcium hydrosulfide is unstable and decomposes to form hydrogen sulfide. Route VI and V suffer from the drawbacks that ion exchange and salt exchange require expensive raw materials and equipment, and also require a step of final stripping due to the need for working with dilute solutions. It is contemplated that under appropriate conditions, Route IV should produce higher concentration calcium thiosulfate solutions having lower byproduct concentrations compared to these other approaches.

Although calcium thiosulfate has been known for many years with many references in the literature, there are no known commercial methods that employ inexpensive raw materials to produce a high purity calcium thiosulfate solution with low solid byproducts and solid residue of insoluble calcium salts, to provide easy separation of the desired calcium thiosulfate product.

Swaine, Jr. et. al. U.S. Pat. No. 4,105,754 describes the production of calcium thiosulfate by a metathesis reaction of ammonium thiosulfate and calcium hydroxide or calcium oxide. This approach requires constant removal of ammonia by air stripping at below boiling point of the mixture and capturing the gas. Not all the ammonia could be removed by this process and the resulting calcium thiosulfate could have a lingering ammonia odor and or contamination of ammonia or ammonium thiosulfate.

Japanese Patent 6,039 (1973) describes the preparation of calcium and magnesium thiosulfate by treating sulfur and the corresponding sulfite in an alkaline solution. High yields are only obtained with magnesium thiosulfate. This patent also described the formation of calcium thiosulfate from salt exchange process between magnesium thiosulfate and calcium hydroxide.

Sodium thiosulfate and calcium chloride were used in the Spanish Patent 245,171. The byproduct of this approach is a large amount of sodium chloride that also contaminates the resulting calcium thiosulfate.

There remains a need for alternative processes for preparing calcium thiosulfate solutions. It would be desirable to develop an efficient and cost-effective process for preparing calcium thiosulfate solutions, especially one which can produce high concentration calcium thiosulfate product solutions and which can utilize relatively inexpensive starting materials.

BRIEF SUMMARY OF THE INVENTION

The present invention is directed to the preparation of calcium thiosulfate from calcium polysulfide (lime sulfur) oxidation. In the process of the present invention, a calcium hydroxide slurry is provided. Sulfur is added to the calcium hydroxide slurry and reacted with the calcium hydroxide to form a reaction mixture. The reaction mixture is cooled, if needed, to a temperature suitable for oxidation. An oxidant is added to the reaction mixture and reacted under conditions sufficient to form calcium thiosulfate, and the calcium thiosulfate solution is recovered.

Liquid solutions containing high concentrations of calcium thiosulfate can be prepared in accordance with the present invention, having only minimal quantities of solid byproducts and unreacted sulfur. The conditions for oxidation, e.g., time and temperature, preferably are selected to reduce further oxidation of the thiosulfate product to sulfate.

In another aspect of the invention, a contactor/reactor apparatus is provided for reacting lime-sulfur and an oxidant to prepare a calcium thiosulfate solution. The apparatus comprises (i) a bubble column for providing contact between gas bubbles and liquid in a liquid/slurry; (ii) a mechanical agitator for dispersing the gas bubbles within the bubble column; (iii) a venturi ejector/eductor for ejecting accumulated gas at the top portion of the bubble column and educing the gas through a venturi, wherein the venturi contacts the gas with a recirculated portion of the liquid/slurry; and (iv) a pipe/tube contactor in communication with the venturi for contacting the gas and a recirculated portion of the liquid/slurry mixture and returning the mixture to the bottom portion of the bubble column.

BRIEF DESCRIPTION OF THE DRAWINGS

The present invention will now be described in more detail with reference to preferred embodiments of the invention, given only by way of example, and illustrated in the accompanying drawing in which.

DETAILED DESCRIPTION OF THE INVENTION

The present invention utilizes the oxidation of a slurry of lime sulfur and calcium hydroxide with oxygen for the preparation of high purity and concentrated calcium thiosulfate without further need for concentration by evaporation. Advantageously, calcium thiosulfate can be prepared from inexpensive raw materials, such as calcium oxide, sulfur, and oxygen. In the preferred practice of the invention, only minor quantities of byproducts are formed. These residual byproducts generated during lime sulfur production and oxidation usually include calcium sulfite, calcium sulfate, and metal sulfides. Metal sulfides can form as a result of metal oxide impurities in the calcium oxide. In addition, calcium carbonate and silica impurities may accompany commercial calcium oxide. These byproducts and impurities usually amount to less than 2% by weight of the final calcium thiosulfate solution when a high grade of calcium oxide is utilized and the formulation and reaction conditions are adequately controlled. Formulation and reaction conditions are chosen to maximize the utilization of raw materials to form the calcium thiosulfate product and to minimize thermal decomposition and oxidation of the formed product to calcium sulfite and sulfate byproducts.

Residual reaction byproducts, raw material impurities, and unreacted raw materials in the calcium thiosulfate solution can form solid particulate matter, which preferably is filtered out in order to provide a clear, solids-free product solution. Particulate materials, such as calcium sulfate, calcium sulfite, calcium carbonate, calcium hydroxide, metal sulfides and sulfur, can be filtered more efficiently by adjusting pH and by choosing an appropriate flocculent.

Figure 8:
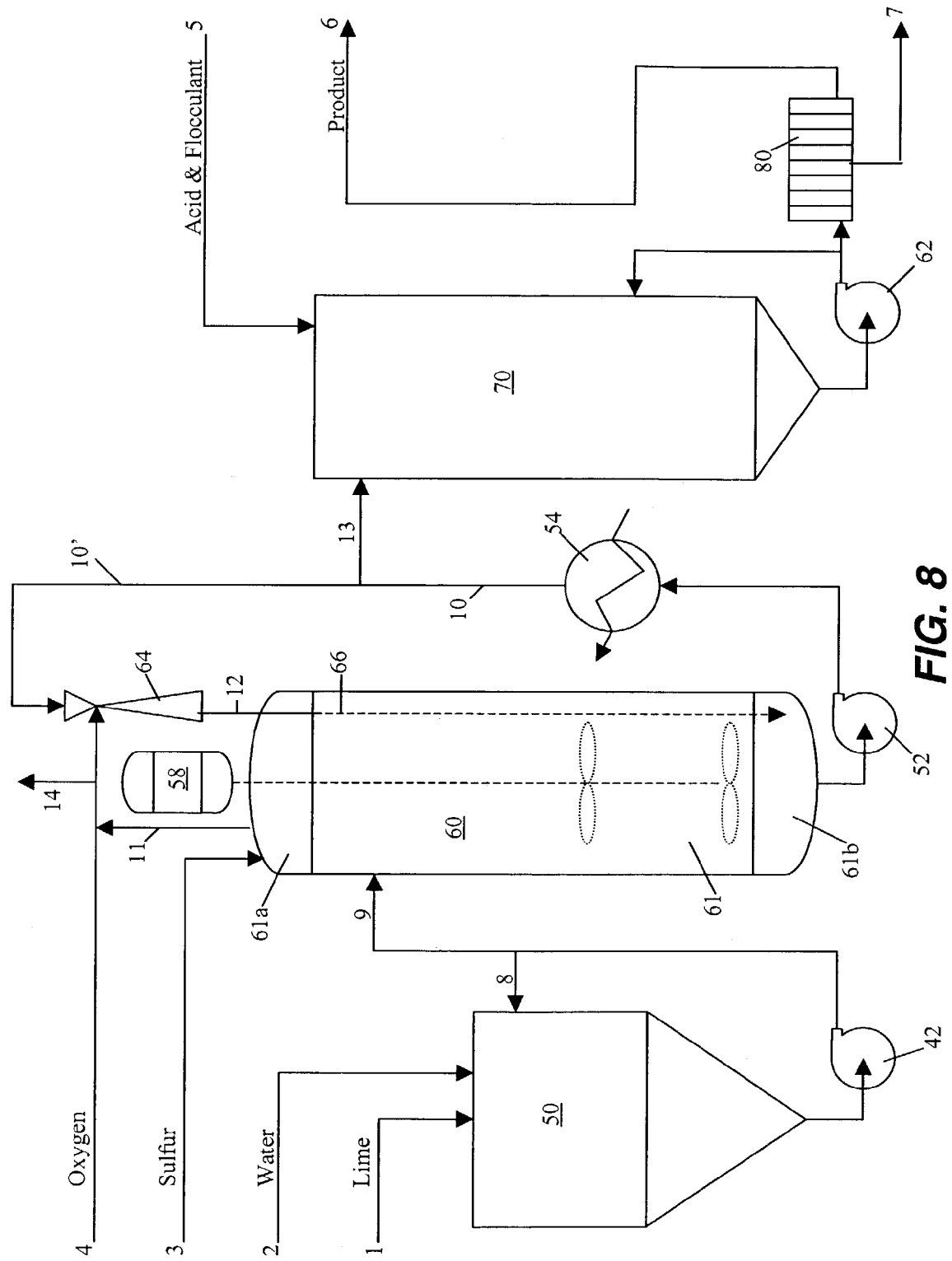
FIG. 8 is a process flow diagram, including a schematic illustration of a contactor/reactor, in accordance with a preferred embodiment of the present invention.

The process of the invention includes a series of process steps, which can be implemented in equipment designed to provide the desired process conditions. The process steps can be accommodated in a single reaction vessel with the appropriate auxiliary equipment (pumps, piping, valves, heat exchangers, filters, controls, etc.) to produce one single batch at a time. The process steps alternatively can be carried out in a series of reaction vessels and holding tanks to facilitate a semi-continuous production arrangement. The process steps can be subdivided into three sections: lime slaking, reaction, and filtration, all normally operated as batch operation (FIG. 8). However, it is contemplated that additional equipment and controls could be used to implement continuous operation.

In the slaking section a weighed amount of dry lime and measured amount of water are mixed to produce a calcium hydroxide, or lime slurry. The dry lime consists primarily of calcium oxide, sometimes referred to as Quicklime, which reacts with water to produce calcium hydroxide, also known as hydrated lime or slaked lime. The reaction is exothermic and causes the temperature of the lime slurry to rise. The temperature rise also assists in speeding and completing the reaction. Cooling equipment generally is not required.

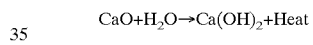

$$CaO + H_2O \rightarrow Ca(OH)_2 + Heat$$

The dry lime can also consist primarily of calcium hydroxide, also known as hydrated lime, which can be mixed with water to produce a lime slurry. In this case there is no reaction and no temperature rise. The lime slurry could also be transferred into the production equipment as ready-made lime slurry from another source and diluted with water to the desired concentration for optimum production of calcium thiosulfate.

The calcium hydroxide concentration should be selected in accordance with such factors as the desired calcium thiosulfate concentration in the final solution. It was found, for example, that when an 11.7% $Ca(OH)_2$ solution was used, a ~24% calcium thiosulfate solution could be prepared. A slightly higher concentration may be used to account for losses of calcium to insoluble byproducts of calcium sulfite and calcium sulfate. Proportionately higher concentrations of lime slurry can be used to produce up to a ~29% calcium thiosulfate solution. Concentrations of ~30% calcium thiosulfate, as well as crystalline calcium thiosulfate, are attainable by evaporation of the solution and dehydration of the crystals.

In the reaction section, the lime slurry transferred from the slaking section is reacted with sulfur to produce lime-sulfur and further reacted with oxygen to produce calcium thiosulfate. Sulfur is added to the lime slurry and the mixture is agitated and heated to a temperature of about 75 to 90° C. (194° F.). Temperatures closer to 90° C. result in better reaction rates; however, higher temperatures result in increased formation of insoluble calcium sulfite resulting from decomposition of the calcium thiosulfate. It is desirable to minimize the decomposition of calcium thiosulfate and formation of calcium sulfite as this lowers the calcium thiosulfate produced and generates insoluble calcium solids that add to filtering load. Molten sulfur is added in a way such that it is dispersed into small particles or it can be added in the solid form as a ground or sublimed powder or as granules or prills. A reaction between sulfur and lime takes place to produce lime-sulfur slurry as a mixture of various soluble products and unreacted calcium hydroxide:

$$3Ca(OH)_2 + 6S \rightarrow 2CaS_2 + CaS_2O_3 + 3H_2O$$

$$4Ca(OH)_2 + 8S \rightarrow 2CaS_3 + CaS_2O_3 + 3H_2O + Ca(OH)_2$$

$$5Ca(OH)_2 + 10S \rightarrow 2CaS_4 + CaS_2O_3 + 3H_2O + 2Ca(OH)_2$$

Sulfur and calcium hydroxide usually are combined at a mole ratio of sulfur-to-calcium hydroxide of from about 2:1 to 5:1, more usually from about 2:1 to 4:1. In one preferred embodiment, about 2 moles of sulfur is added per mole of calcium hydroxide. This is the same mole ratio of sulfur to calcium that is in the calcium thiosulfate, $CaS_2O_3$ product. As can be seen by the above equations, this results in some carry through of unreacted calcium hydroxide and the formation of some low solubility calcium disulfide along with the formation of more soluble higher polysulfides. In the next reaction step, the lime-sulfur slurry is oxidized to produce the calcium thiosulfate product. The oxidation reaction would ideally react calcium disulfide with oxygen to produce calcium thiosulfate only:

$$2CaS_2 + CaS_2O_3 + 3O_2 \rightarrow 3CaS_2O_3$$

The oxidation of the lime-sulfur slurry with its contained higher calcium polysulfides, however, results the production of calcium thiosulfate and precipitated sulfur. It has been found that under controlled oxidation reaction conditions, as described herein, that this precipitated sulfur further reacts with the available unreacted calcium hydroxide to continue the lime-sulfur reaction during the oxidation reaction. The resulting product at the end of the oxidation reaction step is the desired calcium thiosulfate product with a 2:1 sulfur-to-calcium ratio and very little unreacted sulfur and or calcium hydroxide left over. Virtually all the polysulfide is oxidized to thiosulfate. It has also been found that by carrying this unreacted calcium hydroxide in the lime-sulfur slurry into the oxidation reaction, the precipitated sulfur readily reacts with calcium hydroxide and prevents sulfur and other insoluble calcium compounds from collecting on the equipment surfaces. This is advantageous in maintaining heat exchange efficiency and in avoiding or reducing the need to clean internal surfaces of the process equipment.

An alternate method is to produce lime-sulfur solution at a mole ratio of about 3.6 to 4 moles of sulfur per mole calcium hydroxide, which results in a much more soluble lime-sulfur solution product that is more suitable for holding or storing for extended periods of time. This is not, of course, the theoretical 2:1 molar ratio of sulfur to calcium that is desirable for optimum production of calcium thiosulfate. Oxidation of this solution will result in calcium thiosulfate with excess precipitated sulfur left over in the solution that must be filtered out and disposed of or recycled back into lime-sulfur production, which adds additional processing and handling.

In an alternate embodiment of the invention, a lime-sulfur solution is initially produced at a mole ratio of about 3.6 to 4 moles of sulfur per mole calcium hydroxide, and then the amount of calcium hydroxide required to obtain the stoichiometric 2:1 ratio is added prior to or during the oxidation step.

The oxidation step can be carried out in the same reaction vessel as for the lime-sulfur production or can be carried out in separate process equipment. The lime-sulfur slurry is cooled to the preferred oxidation temperature and reacted with oxygen to produce calcium thiosulfate. Oxidation temperatures above 75° C. should be avoided when producing calcium thiosulfate solutions of 24% because of calcium thiosulfate decomposition losses. Lower oxidation reaction temperatures work but increase the time to complete the oxidation reaction.

The oxidation reaction is exothermic and the heat generated during the oxidation process is removed with heat exchange to maintain the desired temperature. When all the lime-sulfur slurry is fully oxidized to calcium thiosulfate, no more oxygen is consumed.

The oxygen used for the purpose of oxidizing can be supplied by atmospheric air or by an enriched oxygen supply source. It is delivered to the oxidation reactor at the desired pressure and volume required to support the oxidation reaction. The primary factors that determine the rate of oxidation and the time to complete the oxidation reaction are oxygen concentration, lime-sulfur slurry contact area with the oxygen, and reaction temperature. The objective is to complete the reaction in a reasonable amount of time consistent with production requirements and to avoid prolonged reaction times that can lead to increased amounts of decomposition products and oxidation to form calcium sulfate. While atmospheric air or enriched oxygen is preferred, it is possible to use other oxidants, such as $SO_2$, with appropriate reaction modifications.

Oxygen supplied by air at atmospheric pressure is low in concentration making for very long reaction times that are not suited for production. The concentration of oxygen in air can however be increased by compression to higher pressures. Increasing its pressure to five atmospheres or about 60 psig increases its concentration to about the same level as pure oxygen. When air is used the inert gases must be vented or purged periodically. Alternatively, pure oxygen can be used advantageously at lower pressures and without purging of inert gases.

An important consideration in maintaining good oxidation rates is to provide efficient gas/liquid contacting that provides adequate contact area and contact time for the oxygen carrying gas and the liquid lime-sulfur slurry to react. Contacting is important because the reaction primarily takes place at the oxygen gas liquid slurry interface. If this interface area is not adequate, the reaction will be slow leading to larger amounts of undesirable byproducts.

Many common types of gas/liquid contacting process equipment arrangements can be utilized for contacting and reacting the gas and liquid. These include, but are not limited to bubble columns, packed columns, tray columns, spray columns, mechanically agitated tanks, jet loop, venturi ejector/eductor, pipes/tubes and motionless mixers. In one embodiment of the invention, a special contactor uses elements of common types of contacting equipment combined and arranged advantageously into a single contactor-reactor design. The elements of this arrangement work together in a way to maximize contact time, area, and overall mass-transfer coefficient while reacting 100% of the lime-sulfur slurry and pure oxygen with recycled liquid and gas.

With reference to FIG. 8, a contactor/reactor 60 in accordance with a preferred embodiment of the present invention comprises: (i) a bubble column 61, in which gas bubbles up through and contacts the liquid; (ii) a mechanical agitator 58, which further disperses bubbles within the bubble column 61 to provide additional contact area time and mass-transfer; (iii) a venturi ejector/eductor, where accumulated gas at the top portion 61a of the column is ejected via line 11 and educed through a venturi 64, where it is contacted with recirculated liquid/slurry 10'; and (iv) a pipe/tube contactor 66 where the gas/liquid mixture exiting the venturi 64 is further contacted as it is conducted inside a draft tube, back to the bottom portion 61b of the bubble column 61, where it is recombined with the liquid/slurry.

The resulting calcium thiosulfate product contains a small amount of unreacted sulfur (usually about 1% or less), residual unreacted lime that is even less as long as there is a slight excess of sulfur, lime impurities as very fine particles and a small amount of calcium sulfite and calcium sulfate byproducts that must be separated by filtration.

The optimal lime-sulfur slurry for preparing about a 24% calcium thiosulfate will contain enough active calcium from calcium hydroxide to correspond to about 25% calcium thiosulfate—this is about 6.6% $Ca^{++}$. The contained sulfur corresponds to two times the stoichiometric amount of calcium to correspond to about 25% calcium thiosulfate—this is about 10.5% S.

The optimum reaction conditions of time and temperature for the production of lime-sulfur slurry were investigated. One concern is the stability of calcium thio sulfate at near-boiling temperatures.

It is advantageous to conduct the lime sulfur synthesis in the shortest time possible, which enhances the rate of production, and decreases decomposition of the calcium thiosulfate portion of the product. If calcium thiosulfate decomposes to $CaSO_3$, it cannot be recycled in the process and will increase the solid byproduct. The objective was to define the point where $Ca^{++}$ concentration was maximized. Maximum soluble $Ca^{++}$ concentration indicates maximum reaction of the calcium hydroxide with sulfur to produce soluble calcium polysulfide and calcium thiosulfate. $Ca^{++}$ concentration would serve as the defining control parameter in this investigation process. The final lime sulfur intermediate is a thin slurry. Filtering sampled slurry and performing a titration with EDTA was done to easily and quickly monitor $Ca^{++}$.

Procedures were varied to optimize the time required to maximize calcium concentration in lime-sulfur. In all cases, raw materials consisted of commercial CaO and prilled sulfur and S: $Ca^{++}$ mole ratio of 2:1. The optimum temperature was found to be about 90–92° C. Calcium thiosulfate, in pure solution, was determined to decompose at 97° C. Elevated $H_2S$ evolution is also noted at temperatures greater than 90° C. Foaming occurs during lime-sulfur syntheses conducted near the boiling point but is not as apparent at slightly lower temperatures. Slaking of CaO alone increases temperature of the initial raw materials to about 50–60° C. The $Ca^{++}$ concentration stabilized after about 135 to 190 minutes at about 90–92° C.

The next step of the process involves oxidation of lime-sulfur to the desired calcium thiosulfate. The oxygen source could be, for example, atmospheric air or purified oxygen. Additional factors affecting the oxidation reaction include temperature, pressure and contacting area.

Oxidation of sulfides using air as the $O_2$ source has been mentioned for the recovery of thiosulfates from alkali wastes of Leblanc Soda process where calcium hydrosulfide was oxidized to calcium thiosulfate. The oxidation reaction was conducted within the temperature range of about 55 to 65° C. The process was inefficient and only about 13% total product was obtained after an extended time of purging air into the solution at ambient pressure. Oxidation was successfully carried out with air at elevated pressure in a lab scale pressure reactor (stirred autoclave). The reaction rate was found to be equivalent to that of pure oxygen when the partial pressure of the contained oxygen component was the same as the total pressure for pure oxygen. It was necessary to vent/purge out the inert nitrogen as more air was added.

Oxidation with pure 100% oxygen was successfully conducted at ambient pressure up to about 16 atmospheres and at temperatures from about 35 to 75° C., resulting in complete reactions to produce high concentrations of calcium thiosulfate. The rate of oxidation, however, was less efficient at low temperature unless conducted at high pressure or with an enhanced contact area. Oxidation rates acceptable for preferred commercial production were found in the about 55 to 75° C. temperature range at a total pressure of about one atmosphere (0.0 psig), provided active contacting was employed to maintain a high contact area. A pressure up to about 8 atmospheres preferably is used when only nominal contacting occurs. This active contacting was achieved and carried out in a specially designed contactor-reactor. The contactor-reactor design, as previously described, was developed for this oxidation reaction process to produce commercial quantities of calcium thiosulfate. Smaller quantities were successfully produced in a laboratory autoclave under similar conditions of temperature, pressure and gas contact area to liquid volume ratios but with the capability of exploring higher pressures. High pressures were not necessary as long as good contacting was achieved at optimum reaction temperatures using pure oxygen. An equivalent oxidation reaction rate can be obtained using air instead of pure oxygen, for example, by employing pressures of at least about five times that used for pure oxygen.

Figure 6:
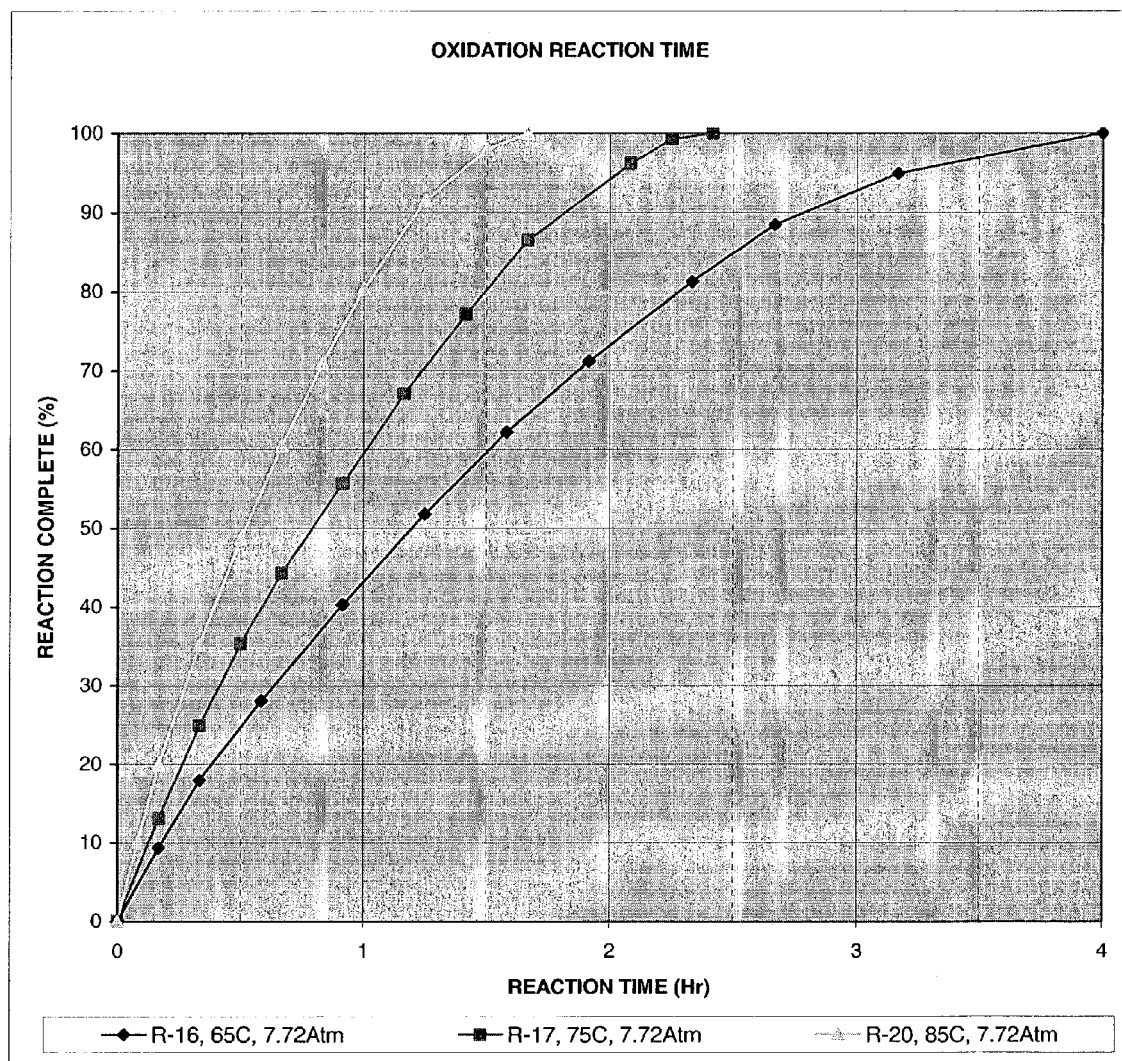
FIG. 6 is a graphical illustration of the progression of oxidation reactions under different conditions as a function of time.

The oxidation reaction rate was mostly independent of the lime sulfur concentration. This was obvious from a steady oxidation reaction rate from beginning to the near the end of the oxidation reaction (FIG. 6). This indicated that the polysulfide was present in large excess throughout the reaction up to near the end of the reaction and oxygen is the rate-limiting agent. Oxygen was added in small addition steps enough to maintain the desired pressure. The reaction was completed when no more oxygen was being added and no decline in pressure was observed. The contacting and oxidation of lime-sulfur slurry takes place primarily at the interface of liquid-slurry/gas interface and, to a lesser degree, by the dissolved oxygen in the lime-sulfur solution.

Figure 5:
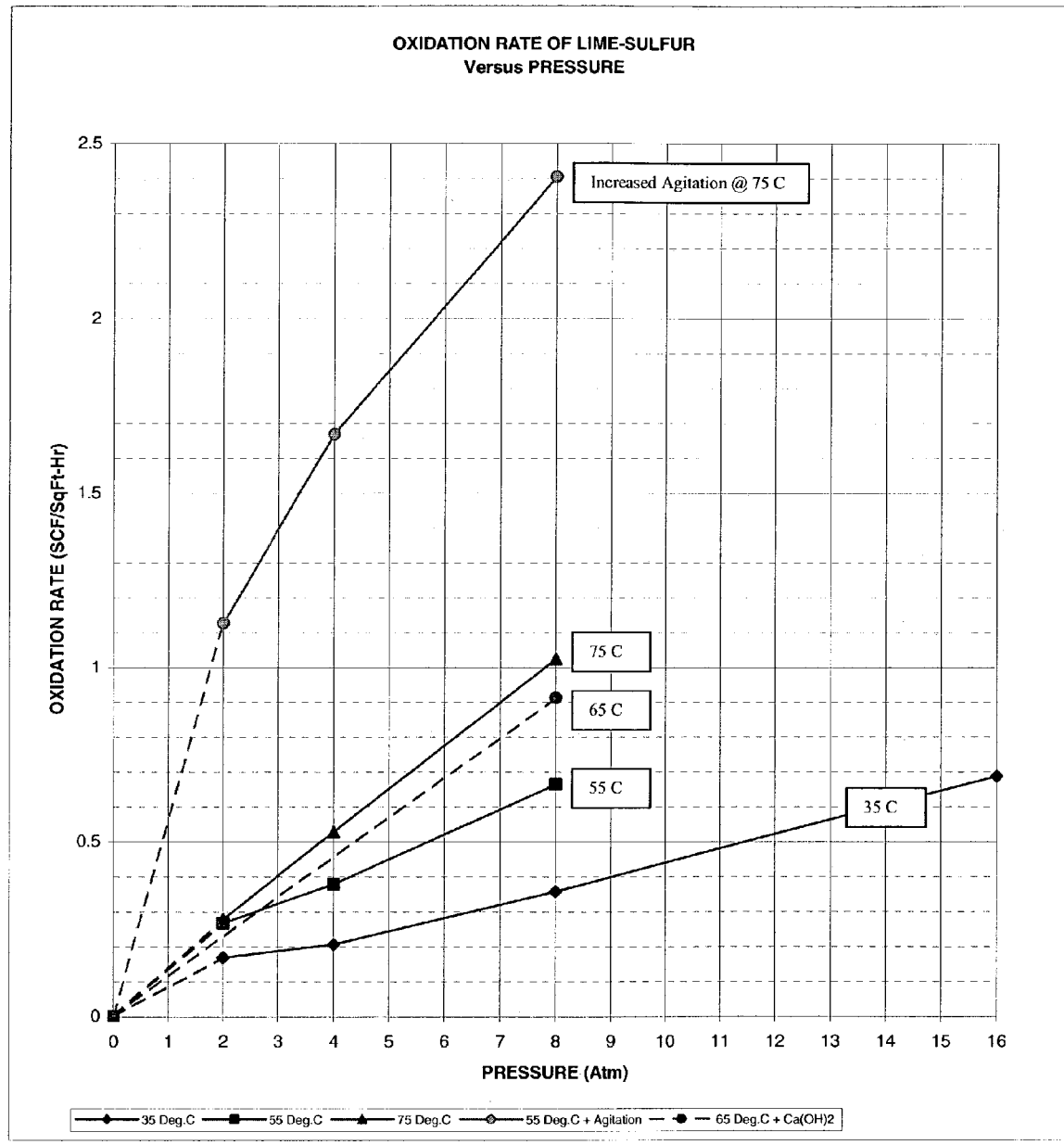
FIG. 5 is a graphical illustration of the oxidation rate of lime-sulfur as a function of pressure.
Figure 7:
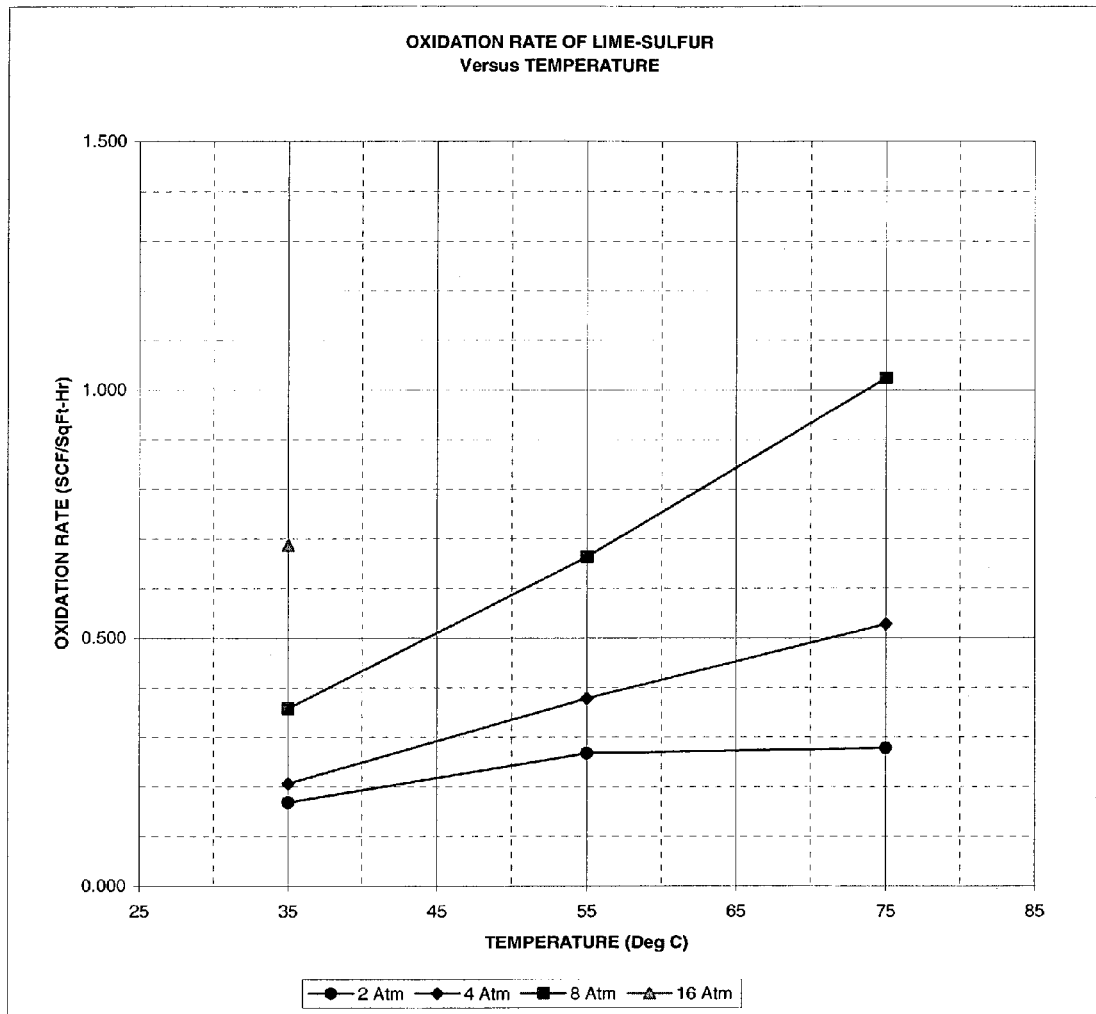
FIG. 7 is a graphical illustration of the oxidation rate of lime-sulfur as a function of temperature.

An increase in the reaction temperature did increase the rate of oxidation, especially for the higher-pressure cases, but not as much as would be expected (FIGS. 5 and 7). In general, a 10° C. temperature increase should increase the rate of reaction by 100%. This is likely due to the lower gas solubility in the liquid at higher temperatures. The upper reaction temperature is limited primarily by the thermal stability of calcium thiosulfate in concentrated solutions. During the end of the oxidation reaction, when the calcium thiosulfate concentration is reaching its maximum, it is especially vulnerable to decomposition at elevated temperatures. Calcium thiosulfate is unstable at higher temperatures decomposing primarily to calcium sulfite and sulfur. This was observed to occur with significant loss of calcium thiosulfate assay and yield at 85° C. with the formation of large amounts of calcium sulfite and calcium sulfate. This higher oxidation reaction temperature potentially could directly oxidize the formed calcium thiosulfate to form calcium sulfate however our observations indicate calcium thiosulfate solution is quite resistant to oxidation, otherwise there would be significant losses during the normal oxidation reaction. Formations of significant amounts of calcium sulfate were encountered at 85° C. but it is most likely formed as a result or oxidation of the calcium sulfite from the thermal decomposition of the calcium thiosulfate.

Filtration of calcium thiosulfate slurry produced from the oxidation reaction was investigated thoroughly for an efficient filtration method. Fine suspensions of calcium salts such as sulfate, sulfite, hydroxide and suspended sulfur, metal hydroxides and metal sulfides generally are difficult to filter in an efficient manner. Flocculants and coagulants have been used in conjunction with filter aids for hard to filter slurries. There is no comprehensive quantitative theory for predicting the behavior of these materials that can be used for their selection. This must ultimately be determined experimentally. Different anionic and non-anionic flocculants were used for efficient filtration of the resulting calcium thiosulfate slurry.

Filtration studies were carried out using diatomaceous earth for pre-coating. Quantity of diatomaceous earth was 0.125% of the slurry.

Application of flocculants was studied over a range of temperatures. The objective was to verify that the temperature of the slurry did not compromise flocculent performance. Flocculant dosage was varied at temperatures from 10–50° C. until flocculant appearance was consistent. It was found that increasing the temperature enhanced the filtration rate.

Dosage of flocculant was also investigated from under dosing to overdosing. Generally, the best performance was achieved when about 50–70 $\mu$g/g of flocculant-to-slurry was used. Flocculant size does not appear to significantly affect filtration rate. Anionic flocculants generally perform better than non-anionic flocculants.

Figure 1:
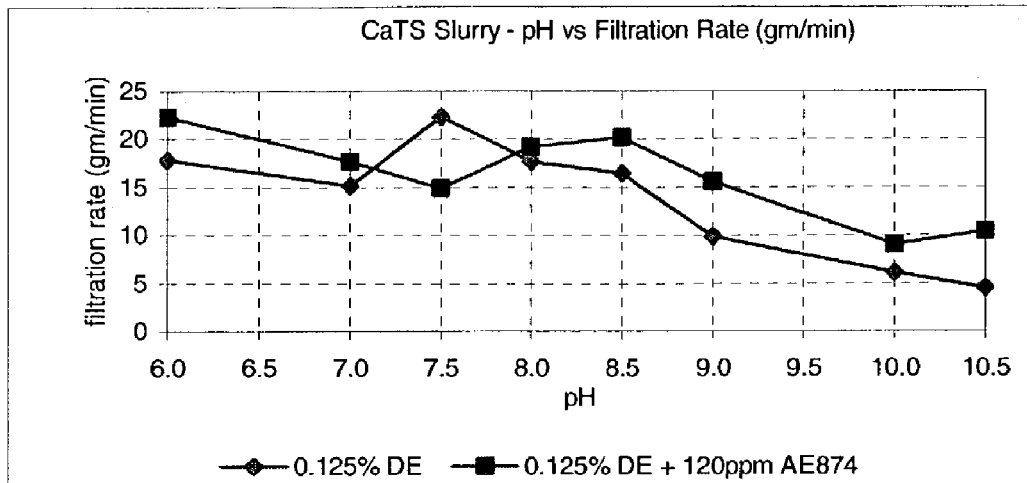
FIG. 1 is a graphical illustration of the filtration rate of a calcium thiosulfate slurry as a function of pH.
Figure 2:
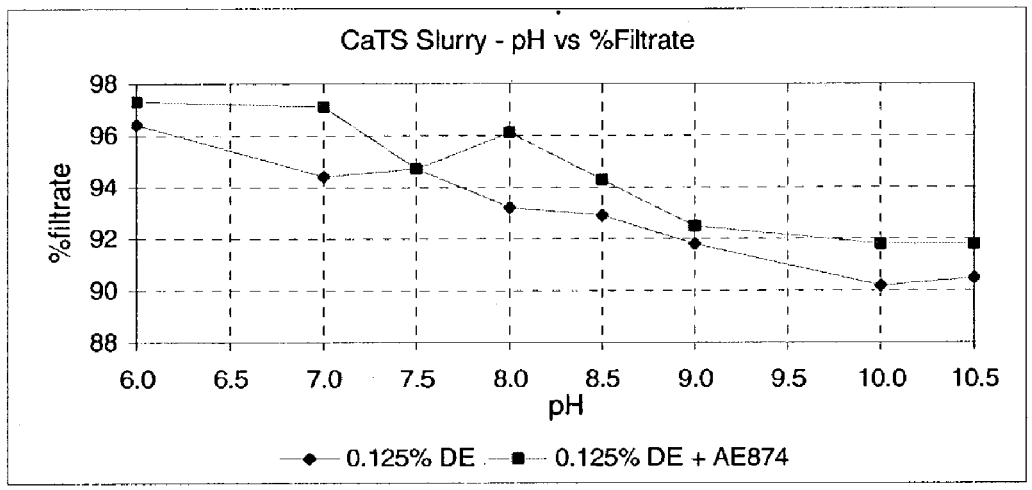
FIG. 2 is a graphical illustration of the percent filtrate of a calcium thiosulfate slurry as a function of pH.
Figure 3:
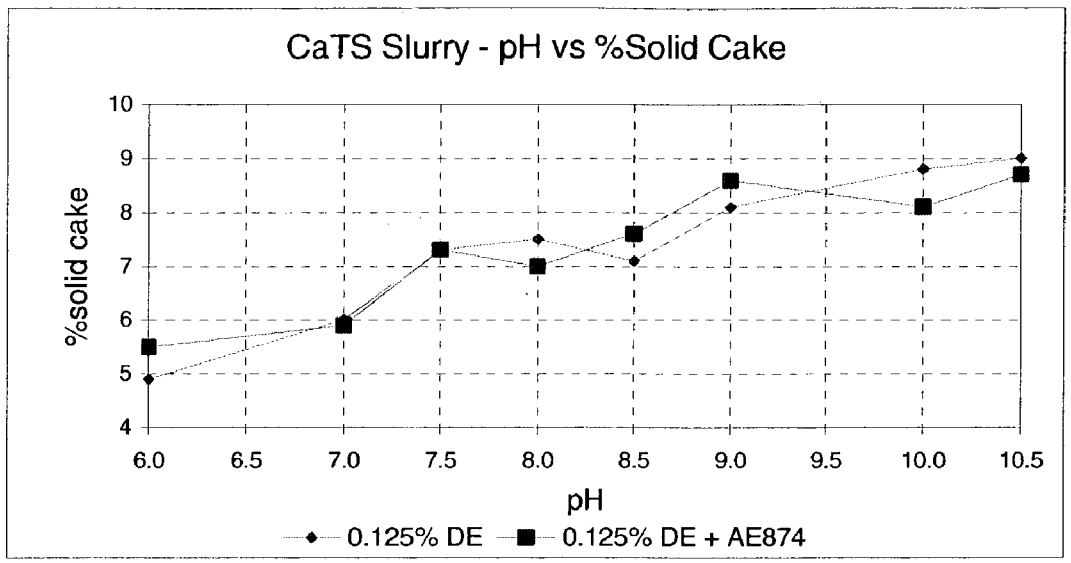
FIG. 3 is a graphical illustration of the percent solid cake of a calcium thiosulfate slurry as a function of pH.

The effect of pH on the flocculant (floc.) performance and ease of filtration of the slurry was also studied. It was observed that anionic flocculants lose their effectiveness at about pH>11. Evaluation of calcium thiosulfate slurries treated with an anionic flocculent, AE874, and slurries not treated were performed at pH values ranging from 6.0 to 10.5. Evaluation parameters included filtration rate, relative settling after consistent time and % solid cake and % filtrate in comparison to original slurry weight. The data is evaluated in Table 1 and further plotted in FIGS. 1, 2 and 3.

TABLE 1

Effects of pH Adjustment on the Filtration of Calcium Thiosulfate

| pH of slurry | rate of filtration (gm/min) | | % filtrate (per total slurry weight) | | % solid cake (per total slurry weight) | |
|---|---|---|---|---|---|---|
| | control | floc. | control | floc. | control | floc. |
| 10.5 | 4.49 | 10.41 | 90.5 | 91.8 | 9.0 | 8.7 |
| 10.0 | 6.14 | 9.01 | 90.2 | 91.8 | 8.8 | 8.1 |
| 9.0 | 9.87 | 15.54 | 91.8 | 92.5 | 8.1 | 8.6 |
| 8.5 | 16.43 | 20.22 | 92.9 | 94.3 | 7.1 | 7.6 |
| 8.0 | 17.71 | 19.18 | 93.2 | 96.1 | 7.5 | 7.0 |
| 7.5 | 22.33 | 14.88 | 94.7 | 94.7 | 7.3 | 7.3 |
| 7.0 | 15.14 | 17.70 | 94.4 | 97.1 | 6.0 | 5.9 |
| 6.0 | 17.81 | 22.34 | 96.4 | 97.3 | 4.9 | 5.5 |

Data indicates filtration rate is improved for both the untreated slurries and the slurries treated with flocculent as pH is reduced. However, the rate of filtration in flocculant-treated solutions still surpasses that of untreated mixtures. Optimum pH is indicated between about 8 and 8.5. (For the slurry control at pH=10.5, rate=4.5 gm/min; the control at pH=8.5, rate= 16.4 g/min and flocculant treated slurry at pH=8.5, rate=20.2 g/min.). Data also indicates that as pH is reduced, the quantity of filtrate increases and the quantity of filter cake solids decreases, relative to the amount of the slurry treated.

Different acids were tested for pH adjustment ranging from strong mineral acids to citric acid, and acetic acid. Calcium thiosulfate has a very low buffer capacity and it requires very small amount of acid to change its pH. Generally, strong mineral acid tends to decompose calcium thiosulfate and easy to over shoot the pH. Citric acid and acetic acid are preferred.

Calcium thiosulfate at neutral or close to neutral pH (e.g., 7.5 to 8.5) is very stable and has a long shelf life.

Long-term stability calcium thiosulfate was addressed. Stability studies were conducted at 40° C. for one week. All concentrations of calcium thiosulfate retained stability over this period at 40° C. in closed bottles. Calcium thiosulfate is exceedingly stable when stored in indoor conditions. An assay of a sample solution after many months did not change.

Figure 4:
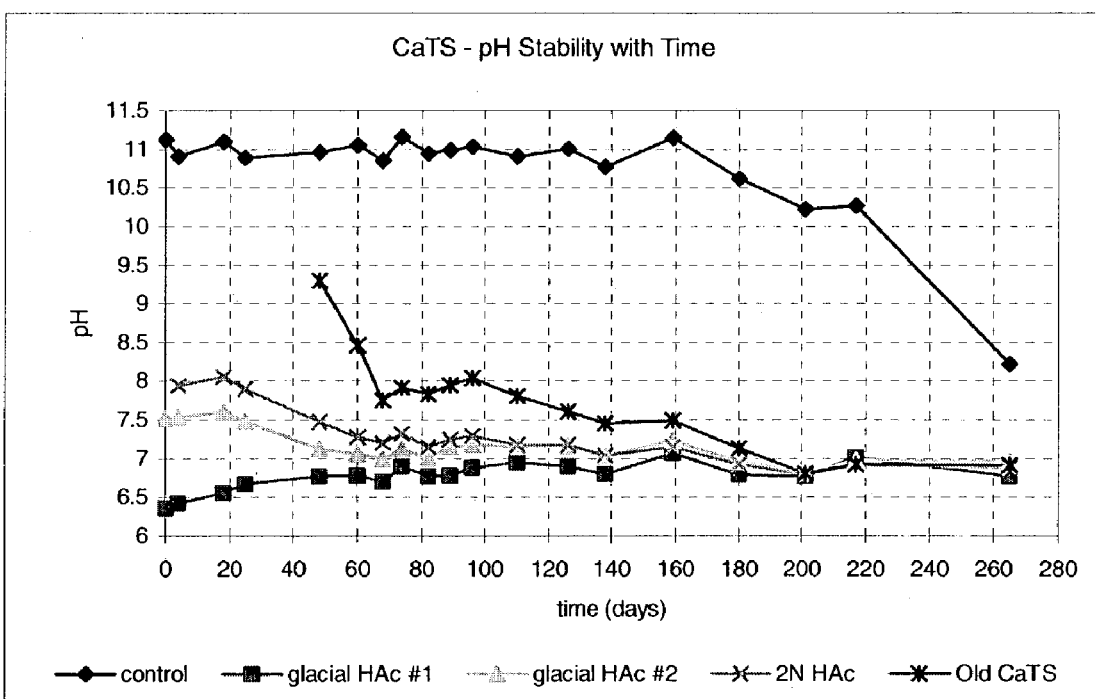
FIG. 4 is a graphical illustration of the pH stability of different calcium thiosulfate solutions over time.

As is noted graphically, the pH of the acid adjusted solutions remained stable, while pH of the control (unadjusted) solution was dropped (FIG. 4). pH was 10.27 after 217 days of storage. At 265 days, pH was 8.22, while the pH of an adjusted sample remained stable.

1. Lime Slaking Reaction

With reference to FIG. 8, the formulated amount of water is added to the lime slaking tank 50 through line 2, and agitation is supplied by a recirculating pump 42, which recirculates the slurry mixture into the lime slaking tank 50 via recirculating line 8. The formulated amount of calcium oxide is added via screw conveyor (not shown) through line 1 into the water. The minimum slaking time needed is about 30 minutes. The exothermic reaction will cause the slurry mixture to rise in temperature by about 22° C. (40° F.).

2. Lime-Sulfur Reaction

The slaked lime is transferred to the contactor/reactor 60 through line 9. The formulated amount of sulfur is added to the contactor/reactor 60 through line 3. The reaction mixture can be heated to a suitable reaction temperature, e.g., at least about 70° C., and preferably about 90° C. (194° F.). The reaction mixture is agitated using an impeller 58 and reacted at about 90° C. for about 3 hours. At the end of the reaction, all the sulfur should be fully reacted and the calcium concentration in the lime-sulfur solution at a maximum. The lime-sulfur is thin slurry at this point and will form a large mass of soft needle crystals if allowed to cool to room temperature.

3. Oxidation Reaction

The lime-sulfur slurry is then cooled to the oxidation reaction temperature of about 55–75° C., preferably about 65° C., prior to the introduction of oxygen. The vapor space is evacuated or purged out through line 14 with oxygen in order to have the maximum oxygen concentration for operation at minimum reactor pressure.

The oxidation reaction is initiated with the start of contacting by activating the circulation pump and agitator 52. Oxygen is supplied to the reactor 60 at a flow rate sufficient to maintain a positive reactor pressure. The heat generated by the oxidation reaction is removed by a heat exchanger 54 in order to maintain the desired reaction temperature. Preferably, the cooling is sufficient to keep the reaction temperature from increasing above the set operating temperature.

The oxidation reaction generally is continued until the oxygen flow required to maintain reactor pressure drops off to zero. The reaction mixture will consume no more oxygen and no further heat is generated. At this point, substantially all of the polysulfide is converted to calcium thiosulfate and only minor amounts of calcium hydroxide and or sulfur remain unreacted, along with minor amounts of calcium sulfite and/or calcium sulfate, which may be present as impurities associated with lime feed stock.

4. Filtering

The calcium thiosulfate product is transferred to the filter feed tank 70 through line 13. The required amount of acid and flocculent are added through line 5 to obtain optimum product pH and filtering properties. This treatment produces a colloidal solution, which is fed to a filter 80 via pump 62. The filter 80 separates the calcium thiosulfate solution 6 from the residue 7, which can be discarded or further processed. The product calcium thiosulfate solution 6 is a clear liquid, with concentrations achievable up to about 29%.

EXAMPLE 1

Lime Slaking, Bench Scale 157 grams of water is placed in a stirred reactor fitted with a thermometer and 21 grams of commercial CaO is charged into the reactor. The exothermic mixture is stirred for 30–40 minutes for complete slaking.

EXAMPLE 2

Lime Sulfur Preparation 24 grams of sulfur is charged into the stirred, slacked slurry prepared in Example 1. The stirred mixture is heated to 90° C. The heating and stirring is continued for about 3 hours until all the sulfur is fully reacted and a lime-sulfur slurry has formed.

EXAMPLE 3

Calcium Thiosulfate Preparation

The lime-sulfur slurry prepared in Example 2 is transferred to a stirred reactor capable of being pressurized and equipped with an inlet and outlet for air purge and introduction of oxygen, a thermometer, and a cooling system. Moderate stirring is applied to the mixture to provide an even interface of liquid-gas and with no vortex formation. The reactor is purged with oxygen and pressurized to 10–15 psig followed by venting to 0.0 psig. The mixture is heated to 55–75° C. Oxygen is introduced to the reactor to initiate oxidation. Oxidation pressure of the system is maintained at 4–8 atmospheres. Oxidation is continued until oxygen is no longer absorbed, which is apparent by the absence of further pressure drop or heat rise.

EXAMPLE 4

Filtration

The solution prepared in Example 3 is carefully adjusted to a pH of 7.5 to 8.5 in the filtering tank equipped with agitation and pH electrode with acetic acid. Filtration aid and 20–40 ppm of flocculent is added, and the mixture is filtered. The resulting calcium thiosulfate product is a colorless, odorless liquid. Concentration of nearly 27% can be prepared without significant loss of product to decomposition solids and without concentrating the product by evaporation.

The principles, preferred embodiments and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit of the invention.

What is claimed is:

1. A process for preparing a calcium thiosulfate solution comprising:
   providing a calcium hydroxide slurry;
   adding sulfur to the calcium hydroxide slurry at a sulfur-to-calcium hydroxide mole ratio of from about 3.6:1 to about 5:1 and reacting the sulfur and calcium hydroxide at a temperature of at least about 90° C. to form a reaction mixture containing at least one calcium polysulfide;
   cooling the reaction mixture to a temperature of from about 55 to about 75° C. for oxidation;
   adding to the reaction mixture an oxidant and reacting under conditions sufficient to form calcium thiosulfate; and
   recovering the calcium thiosulfate solution.

2. The process of claim 1 further comprising an initial step of preparing said calcium hydroxide slurry by combining calcium oxide and water.

3. The process of claim 1 wherein said sulfur-to-calcium hydroxide mole ratio is from about 3.6:1 to about 4:1.

4. The process of claim 1 wherein said sulfur-to-calcium hydroxide mole ratio is about 4:1 to about 5:1.

5. The process of claim 1 wherein the oxidation reaction is conducted at a pressure of from about 10 to about 15 psig.

6. A process for preparing a calcium thiosulfate solution comprising:
   preparing a calcium hydroxide slurry by combining calcium oxide and water;
   adding sulfur to the calcium hydroxide slurry and reacting the sulfur and calcium hydroxide to form a reaction mixture, wherein from about 3.6 to about 4 moles of sulfur is added per mole of calcium hydroxide;
   cooling the reaction mixture, if needed, to a temperature suitable for oxidation;
   adding additional calcium hydroxide to the reaction mixture such that the mole ratio of sulfur to calcium hydroxide is reduced to about 2:1;
   adding to the reaction mixture an oxidant and reacting under conditions sufficient to form a suspension containing calcium thiosulfate;
   adding an acid to the suspension; and
   adding a flocculant to the suspension and recovering said calcium thiosulfate solution.

7. The process of claim 6 wherein said additional calcium hydroxide is added prior to reacting with said oxidant.

8. The process of claim 6 wherein said additional calcium hydroxide is added during reacting with said oxidant.

9. The process of claim 6 wherein the step of adding sulfur to the calcium hydroxide solution further comprises heating the reaction mixture to a temperature of at least about 55° C.

10. The process of claim 9 wherein the reaction mixture is heated to a temperature of at least about 75° C.

11. The process of claim 6 wherein the oxidation reaction is conducted at a temperature of from about 55 to about 75° C.

12. The process of claim 6 wherein the oxidation reaction is conducted at a pressure of from about 10 to about 15 psig.

13. A process for preparing a calcium thiosulfate solution comprising:
providing a calcium hydroxide slurry;
adding sulfur to the calcium hydroxide slurry at a sulfur-to-calcium hydroxide mole ratio of from about 2:1 to about 5:1 and reacting the sulfur and calcium hydroxide at a temperature of at least about 90° C. to form a reaction mixture containing at least one calcium polysulfide;
cooling the reaction mixture to a temperature of from about 55 to about 75° C. for oxidation;
adding to the reaction mixture an oxidant and reacting under conditions sufficient to form calcium thiosulfate; and
adding a flocculant, filtering, and recovering the calcium thiosulfate solution.

14. The process of claim 13 further comprising an initial step of preparing said calcium hydroxide slurry by combining calcium oxide and water.

15. The process of claim 13 wherein said sulfur-to-calcium hydroxide mole ratio is from about 3.6:1 to about 4:1.

16. The process of claim 13 wherein said sulfur-to-calcium hydroxide mole ratio is from about 4:1 to about 5:1.

17. The process of claim 13 wherein the oxidation reaction is conducted at a pressure of from about 10 to about 15 psig.

* * * * *

UNITED STATES PATENT AND TRADEMARK OFFICE
CERTIFICATE OF CORRECTION

PATENT NO.         : 6,984,368 B2
APPLICATION NO. : 10/456568
DATED                  : January 10, 2006
INVENTOR(S)        : Michael Massoud Hojjatie et al.

It is certified that error appears in the above-identified patent and that said Letters Patent is hereby corrected as shown below:

On the cover page, Inventors section (75):
    Please replace "Hajjatie" with --Hojjatie--

Signed and Sealed this

Fourth Day of July, 2006

JON W. DUDAS
*Director of the United States Patent and Trademark Office*